US010640693B2

(12) United States Patent
Zha et al.

(10) Patent No.: US 10,640,693 B2
(45) Date of Patent: May 5, 2020

(54) STAR MACROMOLECULES FOR WELLBORE APPLICATIONS

(71) Applicant: Halliburton Energy Services, Inc., Houston, TX (US)

(72) Inventors: Weibin Zha, The Woodlands, TX (US); Hui Zhou, The Woodlands, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 121 days.

(21) Appl. No.: 15/751,260

(22) PCT Filed: Sep. 15, 2015

(86) PCT No.: PCT/US2015/050185
§ 371 (c)(1),
(2) Date: Feb. 8, 2018

(87) PCT Pub. No.: WO2017/048234
PCT Pub. Date: Mar. 23, 2017

(65) Prior Publication Data
US 2018/0230355 A1 Aug. 16, 2018

(51) Int. Cl.
*C09K 8/12* (2006.01)
*C09K 8/516* (2006.01)
(Continued)

(52) U.S. Cl.
CPC ............... *C09K 8/12* (2013.01); *C09K 8/035* (2013.01); *C09K 8/508* (2013.01); *C09K 8/5083* (2013.01); *C09K 8/516* (2013.01); *C09K 2208/18* (2013.01)

(58) Field of Classification Search
None
See application file for complete search history.

(56) References Cited

U.S. PATENT DOCUMENTS 7,884,056 B2 2/2011 Bendejacq et al.
8,173,750 B2 5/2012 Jakubowski et al.
(Continued)

FOREIGN PATENT DOCUMENTS

WO 2008/001049 A1 1/2008

OTHER PUBLICATIONS

International Preliminary Report on Patentability issued in related PCT Application No. PCT/US2015/050185 dated Mar. 29, 2018, 8 pages.

(Continued)

*Primary Examiner* — John J Figueroa
(74) *Attorney, Agent, or Firm* — Tenley Krueger; Baker Botts L.L.P.

(57) ABSTRACT

The present disclosure provides treatment fluids that comprise star macromolecules as a fluid loss additive or a viscosifier. An embodiment of the present disclosure is a method comprising: providing a treatment fluid that comprises: an aqueous base fluid; and a star macromolecule that comprises: a hydraulic polymeric core, a first group of polymeric arms attached to the core wherein each of the arms in the first group consists of hydrophilic monomers, and a second group of polymeric arms attached to the core wherein each of the arms in the second group comprises at least one hydrophilic homopolymeric segment and at least one hydrophobic homopolymeric segment; and introducing the treatment fluid into a wellbore penetrating at least a portion of a subterranean formation.

7 Claims, 2 Drawing Sheets

(51) Int. Cl.
C09K 8/035 (2006.01)
C09K 8/508 (2006.01)

(56) References Cited

U.S. PATENT DOCUMENTS

| | | |
|---|---|---|
| 8,569,421 B2 | 10/2013 | Jakubowski et al. |
| 8,604,132 B2 | 12/2013 | Jakubowski et al. |
| 2012/0241220 A1 | 9/2012 | Quintero et al. |
| 2015/0218438 A1* | 8/2015 | McCarthy ............ C09K 8/035 |
| | | 507/224 |
| 2017/0355803 A1* | 12/2017 | Huang .................... C08F 8/12 |

OTHER PUBLICATIONS

International Search Report and Written Opinion issued in related PCT Application No. PCT/US2015/050185 dated May 13, 2016, 12 pages.
Gao, Haifeng, and Krzysztof Matyjaszewski. "Arm-first method as a simple and general method for synthesis of miktoarm star copolymers." Journal of the American Chemical Society 129.38 (2007): 11828-11834.

* cited by examiner

US 10,640,693 B2

STAR MACROMOLECULES FOR WELLBORE APPLICATIONS

CROSS-REFERENCE TO RELATED APPLICATION

The present application is a U.S. National Stage Application of International Application No. PCT/US2015/050185 filed Sep. 15, 2015, which is incorporated herein by reference in its entirety for all purposes.

BACKGROUND

The present disclosure relates to systems and methods for treating subterranean formations.

Natural resources such as oil or gas residing in a subterranean formation can be recovered by drilling a wellbore that penetrates the formation. The wellbore passes through a variety of subterranean formations. This may include non-reservoir zones (i.e., formations that do not contain oil and gas) and reservoir zones (i.e., formations that do contain oil or gas). The subterranean formations may also have varying degrees of permeability. During the drilling of the wellbore, a drilling fluid may be used to, among other things, cool the drill bit, lubricate the rotating drill string to prevent it from sticking to the walls of the wellbore, prevent blowouts by serving as a hydrostatic head to the entrance into the wellbore of formation fluids, and remove drill cuttings from the wellbore. A drilling fluid may be circulated downwardly through a drill pipe and drill bit and then upwardly through the wellbore to the surface.

When the drilling fluid contacts permeable subterranean formations, fluid (e.g., water or oil) may be lost into the formation. A drilling operation where this has occurs may also be said to have "fluid loss." Fluid loss control additives may be included in the drilling fluid to reduce fluid loss into the formation. Fluid loss and lost circulation can be more significant during drilling operations into high-permeability zones (e.g., unconsolidated zones or depleted formations), vugular zones, and fractures (e.g., either pre-existing fractures or fractures created during the subterranean operation). When the permeability of the formation is high, for example, because of unconsolidated formations or microfractures, the rate of fluid loss may increase to the point where the drilling fluid can no longer be circulated back to the surface as efficiently, or at all.

BRIEF DESCRIPTION OF THE DRAWINGS

These drawings illustrate certain aspects of some of the embodiments of the present disclosure, and should not be used to limit or define the claims.

Figure 1:
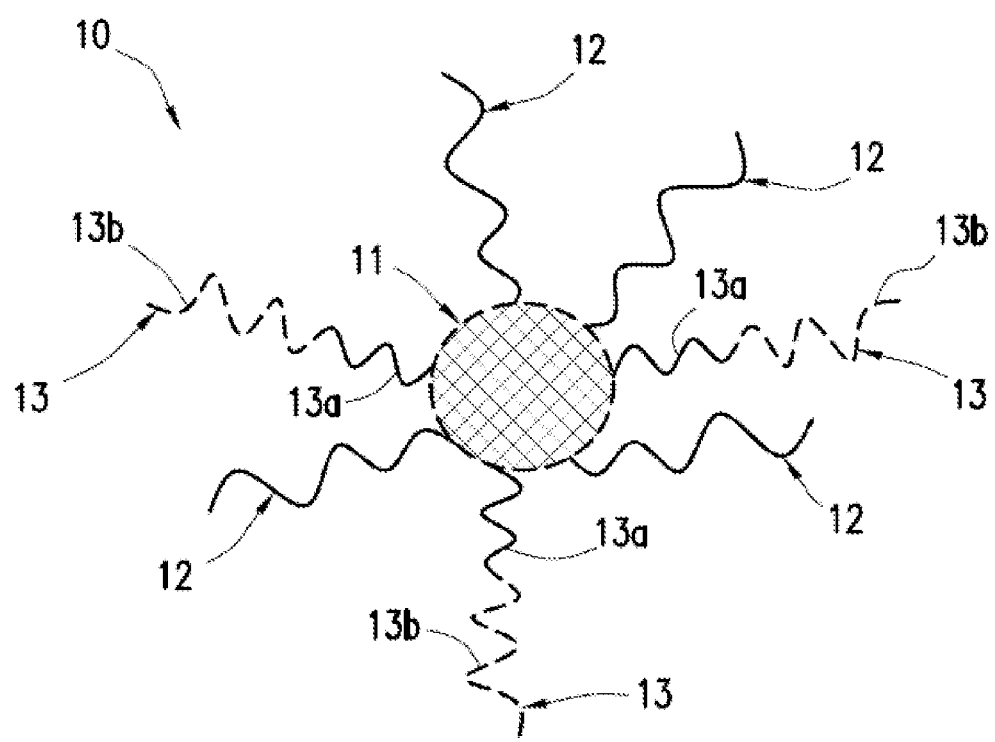
FIG. 1 is a diagram illustrating an example of a star macromolecule that may be used according to certain embodiments of the present disclosure.

While embodiments of this disclosure have been depicted, such embodiments do not imply a limitation on the disclosure, and no such limitation should be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DESCRIPTION OF CERTAIN EMBODIMENTS

The present disclosure provides compositions and methods for fluid loss additives and viscosifiers. More particularly, in certain embodiments, the present disclosure relates to treatment fluids that comprise star macromolecules as a fluid loss additive or a viscosifier.

The present disclosure provides star macromolecules as fluid loss additives or viscosifiers that may be tailored for various treatment fluids. In accordance with embodiments of the present disclosure, a treatment fluid may comprise a base fluid and a fluid loss additive comprising a star macromolecule. In accordance with other embodiments of the present disclosure, a treatment fluid may comprise a base fluid and a viscosifier comprising a star macromolecule. In either embodiment, the treatment fluid may comprise additional components including, but not limited to, additional viscosifiers, pH controlling agents, defoamers, weighting agents, bridging agents, lubricants, corrosion inhibitors, thinner, shale stabilizers, oxygen scavengers, $H_2S$ scavengers, and emulsifiers.

The treatment fluids used in the methods and systems of the present disclosure may comprise any base fluid known in the art, including aqueous base fluids, non-aqueous base fluids, and any combinations thereof. The term "base fluid" refers to the major component of the fluid (as opposed to components dissolved and/or suspended therein), and does not indicate any particular condition or property of that fluids such as its mass, amount, pH, etc. Aqueous fluids that may be suitable for use in the methods and systems of the present disclosure may comprise water from any source. Such aqueous fluids may comprise fresh water, salt water (e.g., water containing one or more salts dissolved therein), brine (e.g., saturated salt water), seawater, or any combination thereof. In some embodiments of the present disclosure, the aqueous fluids comprise one or more ionic species, such as those formed by salts dissolved in water. For example, seawater and/or produced water may comprise a variety of divalent and monovalent cationic species dissolved therein. In certain embodiments, the density of the aqueous fluid can be adjusted, among other purposes, to provide additional particulate transport and suspension in the compositions of the present disclosure. In certain embodiments, the pH of the aqueous fluid may be adjusted (e.g., by a buffer or other pH adjusting agent) to a specific level, which may depend on, among other factors, acids, and other additives included in the fluid. One of ordinary skill in the art, with the benefit of this disclosure, will recognize when such density and/or pH adjustments are appropriate. Examples of non-aqueous fluids that may be suitable for use in the methods and systems of the present disclosure include, but are not limited to, oils, hydrocarbons, organic liquids, and the like. In certain embodiments, the treatment fluids may comprise a mixture of one or more fluids and/or gases, including but not limited to emulsions, foams, and the like. Generally, the base fluid may be present in an amount sufficient to form a pumpable fluid. By way of example, the base fluid may be present in the treatment fluid in an amount in the range of from about 10% to about 99% by volume of the treatment fluid. One of ordinary skill in the art with the benefit of this disclosure will recognize the appropriate amount of base fluid to include within the treatment fluids of the present invention in order to provide a treatment fluid for a particular application.

The treatment fluids used in the methods and systems of the present disclosure may comprise one or more star macromolecules. As used herein, a "star macromolecule" refers to a molecule that comprises a polymer core and a plurality of polymer arms. In certain embodiments, the star macromolecule comprises at least five polymer arms. The core and the arms comprise monomers that may be hydrophobic or hydrophilic depending on the application. The core is a cross-linked polymer chain that may be hydrophobic or hydrophilic depending on the application. The arms are polymers that are attached to the core and comprise one or more polymer or copolymer segments. At least one arm or at least one segment/block exhibits a different solubility from other arms.

In embodiments where the base fluid is a non-aqueous fluid, the star macromolecule may comprise a cross-linked polymeric core that may optionally be hydrophobic. In this embodiment, hydrophobic arms and arms with both hydrophilic and hydrophobic segments are covalently attached to the cross-linked hydrophobic core. FIG. 1 is one example of such a star macromolecule. Star macromolecule 10 includes a polymeric core 11. A plurality of hydrophobic arms 12 are attached to the polymeric core 11. A plurality of arms 13 with both hydrophobic and hydrophilic segments are also attached to the polymeric core 11. Each of arms 13 includes a single hydrophobic homopolymeric segment 13a attached to the polymeric core 11 and a single hydrophilic homopolymeric segment 13b at a distal end of the arm 13. The diagram of FIG. 1 can also be represented by Formula 1:

Formula 1:

In these embodiments, P1 represents a hydrophilic homopolymeric segment comprised of repeating units of hydrophilic monomers. P2 represents a hydrophobic homopolymeric segment comprised of repeating units of hydrophobic monomers. P3 represents a hydrophobic homopolymeric segment comprised of repeating units of hydrophobic monomers. k1 represents the number of repeating units in P1 and has a value between 1 and 50. k2 represents the number of repeating units in P2 and has a value between 10 and 500. k3 represents the number of repeating units in P3 and has a value between 10 and 500. m and n represents the average number of arms covalently attached to the core.

Figure 2:
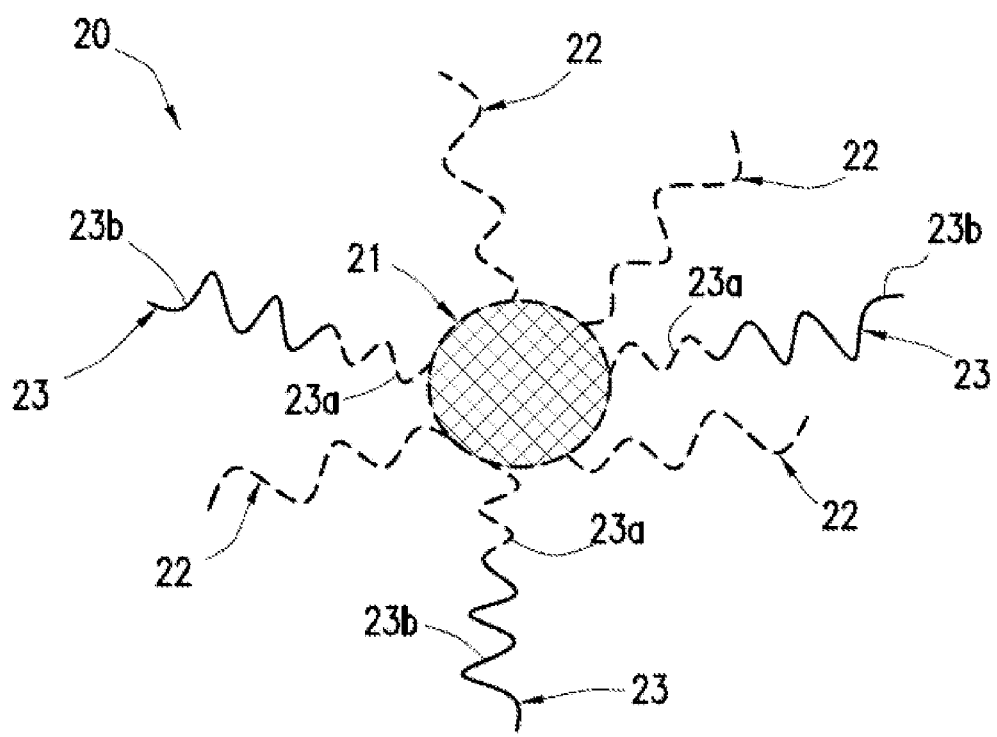
FIG. 2 is a diagram illustrating an example of a star macromolecule that may be used according to other embodiments of the present disclosure.

In embodiments where the base fluid is an aqueous fluid, the structure is similar, but the hydrophobicity of the arms may be reversed. In these embodiments, the star macromolecule may comprise a polymeric core that may optionally be hydrophilic. In this embodiment, hydrophilic arms and arms with both hydrophilic and hydrophobic segments are covalently attached to the cross-linked hydrophobic core. FIG. 2 is one example of such a star macromolecule. Star macromolecule 20 includes a polymeric core 21. A plurality of hydrophilic arms 22 are attached to the polymeric core 21. A plurality of arms 23 with both hydrophilic and hydrophobic segments are also attached to the polymeric core 21. Each of arms 23 includes a single hydrophilic homopolymeric segment 23a attached to the polymeric core 21 and a single hydrophobic homopolymeric segment 23b at a distal end of the arm 23. The diagram of FIG. 2 can also be represented by Formula 2:

Formula 2:

In these embodiments, P1 represents a hydrophobic homopolymeric segment comprised of repeating units of hydrophobic monomers. P2 represents a hydrophilic homopolymeric segment comprised of repeating units of hydrophilic monomers. P3 represents a hydrophilic homopolymeric segment comprised of repeating units of hydrophilic monomers. k1 represents the number of repeating units in P1 and has a value between 1 and 50. k2 represents the number of repeating units in P2 and has a value between 10 and 500. k3 represents the number of repeating units in P3 and has a value between 10 and 500. m and n represents the average number of arms covalently attached to the core.

In different embodiments, the core can be either hydrophobic or hydrophilic in both aqueous and non-aqueous base fluids. However, star macromolecules with mainly hydrophobic arms (e.g., FIG. 1) would typically be used in non-aqueous base fluids, and star macromolecules with mainly hydrophilic arms (e.g., FIG. 2) would typically be used in aqueous base fluids. Without limiting this disclosure to any particular theory or mechanism, when dispersed in the base fluids, the hydrophilic (FIG. 1, for non-aqueous based fluids) or hydrophobic (FIG. 2, for aqueous-based fluids) interaction between the arms may help the star macromolecules to form a transient network, which can increase low shear viscosity and/or suspension capability and reduce fluid loss into the formation. In either embodiment, the arms of the star macromolecule may be further tailored based on the characteristics of the treatment fluid.

Examples of hydrophobic monomers that may be used in the arms or the core according to the teachings of the present disclosure include, but are not limited to, styrene, substituted styrene, alkenes (such as ethylene, propylene), alkyl acrylate, alkyl methacrylate, acrylonitrile, methacrylonitrile, N-alkyl acrylamide and N-alkyl methacrylamide in which the alkyl groups contain more than 3 hydrocarbon chains, vinyl acetate, vinyl esters, N-vinylamides, isoprene, butadiene, diesters of maleic, fumaric, or itaconic acid, and any combination or derivative thereof.

Examples of hydrophilic monomers that may be used in the arms or the core according to the teachings of the present disclosure include anionic, cationic, amphoteric, and non-ionic monomers. Anionic monomers that may be suitable in certain embodiments of the present disclosure include, but are not limited to acrylic acid, methacrylic acid, maleic acid, fumaric acid, itaconic acid, monoesters of maleic, fumaric, or itaconic acid, sodium vinylsulfonate, sodium allyl or methallyl sulfonate, sodium styrenesulfonate, 2-acrylamido-2-methylpropanesulfonic acid (AMPS), sodium 3-allyloxy-2-hydroxypropane-1-sulfonate (AHPS), and vinylphosphonic acid, and any combination or derivative thereof. Although the acids can be polymerized directly, in certain embodiments they are neutralized with base from alkali metal hydroxide, alkaline earth metal hydroxide, ammonia, and amines before polymerization.

Cationic monomers generally contain an amine or ammonium group. Examples of cationic monomers include, but are not limited to, the quaternary ammonium cationic form of 2-, 3- or 4-vinylpyridine, N-vinylimidazole, 2-methyl-1-vinylimidazole, N-(3-(dimethylamino)propyl) methacrylamide, 2-(diethylamino)ethyl methacrylate, (3-acrylamidopropyl)trimethylammonium chloride, diallyldimethylammonium chloride, and any combination or derivative thereof. The amine groups in the cationic monomers can be converted into quaternary ammonium by alkylating agents such as alkyl or aryl halides, or under acidic conditions.

Amphoteric monomers are monomers that contain both anionic and cationic groups. Examples of amphoteric monomers include, but are not limited to, betaine, sulfobetaine (or sultaine), and phosphobetaine-type monomers, and any combination or derivative thereof.

Examples of nonionic monomers include, but are not limited to, acrylamide, methacrylamide, N-alkyl acrylamides or methacrylamides in which the alkyl group contains 1-3 hydrocarbon chains, N-[tris(hydroxymethyl)methyl] acrylamide, N-vinylpyrrolidone, N-vinylcaprolactam, monovinyl or monoallyl ethers of polyols (such as ethylene glycol monovinyl ether, ethylene glycol monoallyl ether, and glycerol monoallyl ether), mono-acrylates or methacrylates of poyols (such as 2-hydroxyethyl acrylate and poly (ethylene glycol) monomethacrylate), and N-vinylamides (such as N-vinylformamide and N-vinylacetamide), and any combination or derivative thereof. Note that the acrylate- and acrylamide-based monomers can be converted to anionic monomers after hydrolysis in water, while N-vinyl-amides can be converted into cationic monomers after hydrolysis in water.

The crosslinkers used to form the hydrophilic core can be either hydrophobic or hydrophilic. Examples of these crosslinkers include, but are not limited to, divinyl ether, diallyl ether, vinyl or allyl ethers of polyglycols or polyols, divinylbenzene, 1,3-divinylimidazolidin-2-one, divinyltetrahydropyrimidin-2(1H)-one, dienes, allyl amines, N-vinyl-3 (E)-ethylidene pyrrolidone, ethylidene bis(N-vinylpyrrolidone), acrylates (such as ethylene glycol diacrylate, polyethylene glycol diacrylates, trimethylolpropane triacrylate, pentaerythritol tetraacrylate), methacrylates (such as ethylene glycol dimethacrylate, polyethylene glycol dimethacrylates, trimethylolpropane trimethacrylate, pentaerythritol tetramethacrylate), diacrylamides (such as methylene bisacrylamide and ethylene bisacrylamide), dimethacrylamides, vinyl or allyl esters (such as diallylphthalate, allyl acrylate, allyl methacrylate, vinyl acrylate, vinyl methacrylate, N-vinylacrylamide, N-vinylmethacrylamide, N-allylacrylamide, and N-allylmethacrylamide), triallyl-1,3-5-triazine-2,4,6(1H,3H,5H)-trione, 2,4,6-triallyloxy-1,3,5-triazine, and any combination of any of the foregoing.

In certain embodiments, the core may swell in the base fluid to provide viscosity control and fluid loss control at the same time. The addition of the hydrophilic and/or hydrophobic segments to the arms can change the compatibility between the polymer and the base fluid. The intermolecular self-association of the hydrophilic segments and hydrophilic segments also may induce shear thinning behavior of the star macromolecule, which may be beneficial to certain treatment fluids. The molecular weight and compositions of the arm segments may be tailored so the structure of the star macromolecule is tuned to fit in different applications. For example, the viscosity of the treatment fluid may be controlled by adjusting the compositions of the arms to increase or decrease the repulsion between the individual star macromolecules.

In certain embodiments, the treatment fluid may further comprise a bridging agent to control fluid loss. In some cases, the weighting agent also works as a bridging agent. In these embodiments, the star macromolecule and the bridging agent may aggregate to form a filter cake. The filter cake may form a barrier to prevent loss of the base fluid into the surrounding formation.

In certain embodiments, the bridging agent may be present in the treatment fluid in an amount sufficient for a particular application. For example, the bridging agent may be included in the treatment fluid to provide the desired degree of fluid loss control. In certain embodiments, the bridging agent may be present in the treatment fluid in an amount up to about 200 lb/bbl. In certain embodiments, the bridging agent may have a particle size in the range of from about 1 micron to about 200 microns. In certain embodiments, the bridging particle size is in the range of from about 1 to about 100 microns but may vary from formation to formation. The particle size used may be determined by, among other factors, the pore throat size of the formation.

In accordance with some embodiments of the present disclosure, the bridging agent is preferably self-degrading or degradable in a suitable clean-up solution (e.g., a mutual solvent, water, an acid solution, etc.). When choosing a particular bridging agent to use, one should be aware of the performance of that bridging agent at the temperature range of the application. Examples of suitable bridging agents include, but are not necessarily limited to, magnesium citrate, calcium citrate, calcium succinate, calcium maleate, calcium tartrate, magnesium tartrate, bismuth citrate, calcium carbonate, sodium chloride and other salts, and the hydrates thereof.

According to certain embodiments, the star macromolecules of the present disclosure may be synthesized using an "arm first" method. "Arm first" means that making the polymeric arms with a functional terminal atom or group is the first step to make the star structure. With functional terminal group as macroinitiator or macromonomer, the crosslinked core can be synthesized with multi-vinyl crosslinkers. If the arm is terminated with atom transfer radical polymerization (ATRP) functional terminal group and the arm acts as a macroinitiator, the star structure can be made by crosslinking multi-vinyl crosslinkers with ATRP method. If the arm is terminated with polymerizable double bond (macromonomer), free radical polymerization can be used to make the core and star structure. In these embodiments, the first formed ATRP macroinitiator can be prepared by conducting a sequential ATRP (co)polymerization of hydrophilic or hydrophobic and hydrophilic monomers or precursors thereof or can be prepared by other polymerization procedures that provide a functional terminal atom or group that can be converted into an ATRP initiator. Then the macroinitiator can be mixed with multi-vinyl crosslinkers and polymerized in a one-pot procedure.

In certain embodiments, the treatment fluid may further comprise an additional fluid loss additive. The additional fluid loss additive may be present in the treatment fluid in an amount sufficient for a particular application. For example, the additional fluid loss additive may be included in the treatment fluid in an amount of about 0.1 pounds per barrel to about 50 pounds per barrel. A person of skill in the art, with the benefit of this disclosure, would know how much additional fluid loss additive to include in the treatment fluid to accomplish a desired goal, depending on, for example, the permeability of the subterranean formation.

In certain embodiments, the treatment fluid may further comprise an additional viscosifying agent or thinner. By way of example, a viscosifying agent may be used in a treatment fluid to impart a sufficient carrying capacity and/or thixotropy to the treatment fluid. For example, where the treatment fluid is a drilling fluid, the viscosifying agent enables the drilling fluid to transport drill cuttings and/or weighting materials, prevent the undesired settling of the drilling cuttings and/or weighting materials.

Where present, a variety of different viscosifying agents may be used that are suitable for use in a treatment fluid. Examples of suitable viscosifiers include, inter alia, biopolymers (e.g., xanthan and succinoglycan), cellulose, cellulose derivatives (e.g., hydroxyethylcellulose), guar, guar derivatives (e.g., hydroxypropyl guar), and any combination or derivative thereof. In certain embodiments of the present invention, the viscosifier is guar. Commercially available examples of suitable viscosifiers include, but are not limited to, those that are available from Halliburton Energy Services, Inc., under the trade name N-VIS®. Combinations of viscosifying agents may also be suitable. The particular viscosifying agent used depends on a number of factors, including the viscosity desired, chemical compatibility with other fluids used in formation of the wellbore, and other wellbore design concerns.

The treatment fluid according to the present disclosure may further comprise additional additives as deemed appropriate by one of ordinary skill in the art, with the benefit of this disclosure. Examples of such additives include, but are not limited to, emulsifiers, wetting agents, dispersing agents, shale inhibitors, pH-control agents, filtration-control agents, alkalinity sources such as lime and calcium hydroxide, salts, or combinations thereof.

The present disclosure in some embodiments provides methods for using the treatment fluids to carry out a variety of subterranean treatments, including but not limited to, hydraulic fracturing treatments, acidizing treatments, and drilling operations. In some embodiments, the treatment fluids of the present disclosure may be used in treating a portion of a subterranean formation, for example, in acidizing treatments such as matrix acidizing or fracture acidizing. In certain embodiments, a treatment fluid may be introduced into a subterranean formation. In some embodiments, the treatment fluid may be introduced into a well bore that penetrates a subterranean formation. In some embodiments, the treatment fluid may be introduced at a pressure sufficient to create or enhance one or more fractures within the subterranean formation (e.g., hydraulic fracturing).

As the treatment fluid is circulated through the wellbore, the star macromolecule may prevent the base fluid from being lost to the formation pores or fractures. Without being limited by theory, it is believed that the swollen star macromolecule itself can block some pores of the formation and also may form at least a portion of a filter cake along with a bridging agent on the surface of the formation to prevent further fluid loss to the formation. This can, among other benefits, reduce the fluid loss and prevent lost circulation while the wellbore is being drilled and/or during subsequent treatments in the wellbore.

In accordance with embodiments of the present invention, a treatment fluid that comprises a base fluid and a star macromolecule may be used as a drilling fluid in drilling a wellbore. In certain embodiments, a drill bit may be mounted on the end of a drill string that may comprise several sections of drill pipe. The drill bit may be used to extend the wellbore, for example, by the application of force and torque to the drill bit. A drilling fluid may be circulated downwardly through the drill pipe, through the drill bit, and upwardly through the annulus between the drill pipe and wellbore to the surface. In an embodiment, the drilling fluid may be employed for general drilling of wellbore in subterranean formations, for example, through non-producing zones. In another embodiment, the drilling fluid may be designed for drilling through hydrocarbon-bearing zones.

Figure 3:
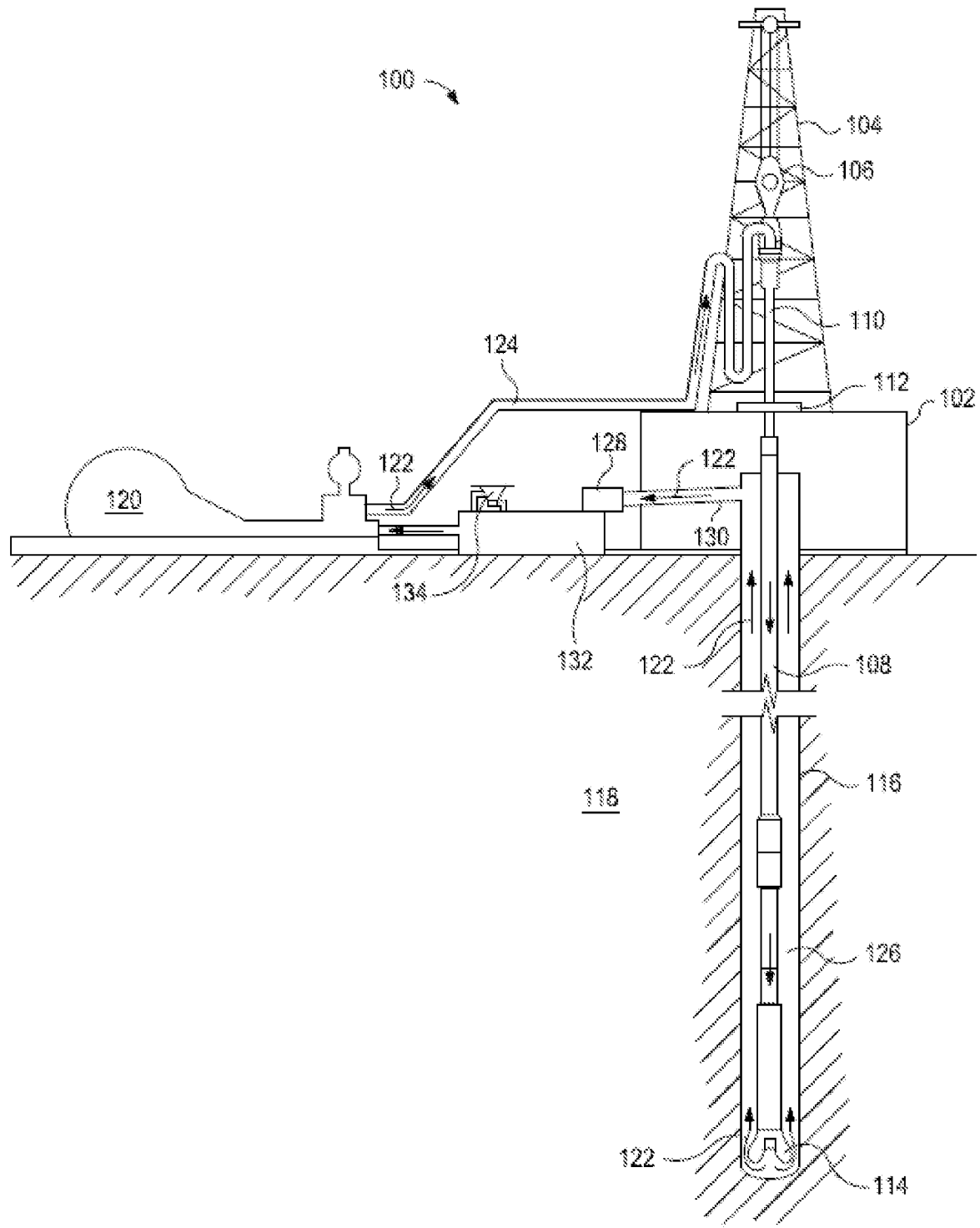
FIG. 3 is a diagram illustrating an example of a system where certain embodiments of the present disclosure may be used.

The treatment fluids and/or other compositions disclosed herein may directly or indirectly affect one or more components or pieces of equipment associated with the preparation, delivery, recapture, recycling, reuse, and/or disposal of the disclosed treatment fluid. For example, and with reference to FIG. 3, the disclosed treatment fluid may directly or indirectly affect one or more components or pieces of equipment associated with an exemplary wellbore drilling assembly 100, according to one or more embodiments. It should be noted that while FIG. 3 generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 100 may include a drilling platform 102 that supports a derrick 104 having a traveling block 106 for raising and lowering a drill string 108. The drill string 108 may include, but is not limited to, drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a borehole 116 that penetrates various subterranean formations 118.

A pump 120 (e.g., a mud pump) circulates drilling fluid 122 through a feed pipe 124 and to the kelly 110, which conveys the drilling fluid 122 downhole through the interior of the drill string 108 and through one or more orifices in the drill bit 114. The drilling fluid 122 is then circulated back to the surface via an annulus 126 defined between the drill string 108 and the walls of the borehole 116. At the surface, the recirculated or spent drilling fluid 122 exits the annulus 126 and may be conveyed to one or more fluid processing unit(s) 128 via an interconnecting flow line 130. After passing through the fluid processing unit(s) 128, a "cleaned" drilling fluid 122 is deposited into a nearby retention pit 132 (i.e., a mud pit). While illustrated as being arranged at the outlet of the wellbore 116 via the annulus 126, those skilled in the art will readily appreciate that the fluid processing unit(s) 128 may be arranged at any other location in the drilling assembly 100 to facilitate its proper function, without departing from the scope of the scope of the disclosure.

One or more of the disclosed star macromolecules may be added to the drilling fluid 122 via a mixing hopper 134 communicably coupled to or otherwise in fluid communication with the retention pit 132. The mixing hopper 134 may include, but is not limited to, mixers and related mixing equipment known to those skilled in the art. In other embodiments, however, the disclosed star macromolecules may be added to the drilling fluid 122 at any other location in the drilling assembly 100. In at least one embodiment, for example, there could be more than one retention pit 132, such as multiple retention pits 132 in series. Moreover, the retention put 132 may be representative of one or more fluid storage facilities and/or units where the disclosed star macromolecule may be stored, reconditioned, and/or regulated until added to the drilling fluid 122.

As mentioned above, the disclosed treatment fluids and/or other compositions may directly or indirectly affect the components and equipment of the drilling assembly 100. For example, the disclosed treatment fluids and/or other compositions may directly or indirectly affect the fluid processing unit(s) 128 which may include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, or any fluid reclamation equipment. The fluid processing unit(s) 128 may further include one or more sensors, gauges, pumps, compressors, and the like used store, monitor, regulate, and/or recondition the exemplary treatment fluid.

The disclosed treatment fluids and/or other compositions may directly or indirectly affect the pump 120, which representatively includes any conduits, pipelines, trucks, tubulars, and/or pipes used to fluidically convey the treatment fluid downhole, any pumps, compressors, or motors (e.g., topside or downhole) used to drive the treatment fluid into motion, any valves or related joints used to regulate the pressure or flow rate of the treatment fluid, and any sensors (i.e., pressure, temperature, flow rate, etc.), gauges, and/or combinations thereof, and the like. The disclosed treatment fluid may also directly or indirectly affect the mixing hopper 134 and the retention pit 132 and their assorted variations.

The disclosed treatment fluids and/or other compositions may also directly or indirectly affect the various downhole equipment and tools that may come into contact with the treatment fluid such as, but not limited to, the drill string 108, any floats, drill collars, mud motors, downhole motors and/or pumps associated with the drill string 108, and any MWD/LWD tools and related telemetry equipment, sensors or distributed sensors associated with the drill string 108. The disclosed treatment fluid may also directly or indirectly affect any downhole heat exchangers, valves and corresponding actuation devices, tool seals, packers and other wellbore isolation devices or components, and the like associated with the wellbore 116. The disclosed treatment fluid may also directly or indirectly affect the drill bit 114, which may include, but is not limited to, roller cone bits, PDC bits, natural diamond bits, any hole openers, reamers, coring bits, etc.

While not specifically illustrated herein, the disclosed treatment fluids and/or other compositions may also directly or indirectly affect any transport or delivery equipment used to convey the treatment fluid to the drilling assembly 100 such as, for example, any transport vessels, conduits, pipelines, trucks, tubulars, and/or pipes used to move the treatment fluid from one location to another, any pumps, compressors, or motors used to drive the treatment fluid into motion, any valves or related joints used to regulate the pressure or flow rate of the treatment fluid, and any sensors (i.e., pressure and temperature), gauges, and/or combinations thereof, and the like.

An embodiment of the present disclosure is a method comprising: providing a treatment fluid that comprises: an aqueous base fluid; and a star macromolecule that comprises: a hydrophilic polymeric core, a first group of polymeric arms attached to the core wherein each of the arms in the first group consists of hydrophilic monomers, and a second group of polymeric arms attached to the core wherein each of the arms in the second group comprises at least one hydrophilic homopolymeric segment and at least one hydrophobic homopolymeric segment; and introducing the treatment fluid into a wellbore penetrating at least a portion of a subterranean formation. Optionally, the treatment fluid is a drilling fluid. Optionally, the treatment fluid further comprises a bridging agent. Optionally, the star macromolecule comprises at least five polymeric arms. Optionally, the first group contains more polymeric arms than the second group. Optionally, each polymeric arm in the second group consists of a single hydrophilic homopolymeric segment attached to the core and a single hydrophobic homopolymeric segment at a distal end of the arm. Optionally, the treatment fluid is introduced into the wellbore using at least one pump.

Another embodiment of the present disclosure is a method comprising: providing a treatment fluid that comprises: a non-aqueous base fluid; and a star macromolecule that comprises: a polymeric core, a first group of polymeric arms attached to the core wherein each of the arms in the first group consists of hydrophobic monomers, and a second group of polymeric arms attached to the core wherein each of the arms in the second group comprises at least one hydrophobic homopolymeric segment and at least one hydrophilic homopolymeric segment; and introducing the treatment fluid into a wellbore penetrating at least a portion of a subterranean formation. Optionally, the treatment fluid is a drilling fluid. Optionally, the treatment fluid further comprises a bridging agent. Optionally, the star macromolecule comprises at least five polymeric arms. Optionally, the first group contains more polymeric arms than the second group. Optionally, each polymeric arm in the second group consists of a single hydrophobic homopolymeric segment attached to the core and a single hydrophilic homopolymeric segment at the distal end of the arm. Optionally, the polymeric core is hydrophobic.

Another embodiment of the present disclosure is a composition comprising: a base fluid; a star macromolecule that comprises a polymeric core and a plurality of at least five polymeric arms attached to the core, wherein at least one of the polymeric arms comprises at least one hydrophilic homopolymeric segment and at least one hydrophobic homopolymeric segment; and a bridging agent. Optionally, the base fluid comprises an aqueous fluid and the polymeric core is hydrophilic. Optionally, the base fluid comprises a non-aqueous fluid and the polymeric core is hydrophobic. Optionally, at least one of the polymeric arms consists of hydrophilic monomers. Optionally, at least one of the polymeric arms consists of hydrophobic monomers. Optionally, the polymeric core comprises monovinyl monomers.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. While numerous changes may be made by those skilled in the art, such changes are encompassed within the spirit of the subject matter defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:
1. A method comprising:
   providing a treatment fluid that comprises:
      a non-aqueous base fluid; and
      a star macromolecule that comprises:
         a polymeric core comprising styrene-methyl acrylate butadiene,
         a first group of polymeric arms attached to the core wherein each of the arms in the first group consists of hydrophobic monomers, and
         a second group of polymeric arms attached to the core wherein each of the arms in the second group comprises at least one hydrophobic homopolymeric segment and at least one hydrophilic homopolymeric segment; and introducing the treatment fluid into a wellbore penetrating at least a portion of a subterranean formation.

2. The method of claim 1 wherein the treatment fluid is a drilling fluid.

3. The method of claim 1 wherein the treatment fluid further comprises a bridging agent.

4. The method of claim 1 wherein the star macromolecule comprises at least five polymeric arms.

5. The method of claim 1 wherein the first group contains more polymeric arms than the second group.

6. The method of claim 1 wherein each polymeric arm in the second group consists of a single hydrophobic homopolymeric segment attached to the core and a single hydrophilic homopolymeric segment at the distal end of the arm.

7. The method of claim 1 wherein the polymeric core is hydrophobic.

\* \* \* \* \*